United States Patent
Shepherd et al.

Patent Number: 6,042,080
Date of Patent: Mar. 28, 2000

[54] MULTI-PURPOSE REST HAVING MAGNETIC BASE

[76] Inventors: Thomas Jefferson Shepherd, Little Village Apartments, Apt. 26, Buckner, Mo. 64016; Daniel Richard Shepherd, 2920 N. 240th St., Waterloo, Nebr. 68069

[21] Appl. No.: 09/211,334

[22] Filed: Dec. 14, 1998

Related U.S. Application Data

[63] Continuation-in-part of application No. 08/802,298, Feb. 18, 1997, abandoned, which is a continuation-in-part of application No. 08/755,532, Nov. 21, 1996, abandoned.

[51] Int. Cl.[7] .................................................. A47G 29/00
[52] U.S. Cl. ........................... 248/683; 42/94; 248/163.1; 248/206.5; 248/688
[58] Field of Search .............................. 248/206.5, 163.1, 248/683, 168, 178.1, 163.2, 346.01, 346.03, 309.4, 310, 688; 396/419, 426, 428; 42/94

[56] References Cited

U.S. PATENT DOCUMENTS

| | | |
|---|---|---|
| 203,184 | 4/1878 | Muller . |
| 1,298,920 | 4/1919 | Farago . |
| 1,314,951 | 9/1919 | Drews . |
| 1,348,910 | 8/1920 | Vlanch . |
| 1,351,817 | 9/1920 | Walters ........................... 248/125.8 X |
| 1,701,800 | 2/1929 | Taylor . |
| 1,733,783 | 10/1929 | Di Medina . |
| 1,795,296 | 3/1931 | De Zeng . |
| 2,110,292 | 3/1938 | Eckler . |
| 2,148,119 | 2/1939 | Grist . |
| 2,464,067 | 3/1949 | Barker . |
| 2,625,356 | 1/1953 | Kennedy et al. ....................... 248/121 |
| 2,642,999 | 6/1953 | McPherson . |
| 2,876,688 | 3/1959 | Laue . |
| 2,940,709 | 6/1960 | Neuwirth ................................ 248/168 |
| 2,977,082 | 3/1961 | Harris .................................. 248/206.5 |
| 3,032,766 | 5/1962 | Weaver . |
| 3,041,938 | 7/1962 | Seabrook . |
| 3,141,393 | 7/1964 | Platt . |
| 3,225,656 | 12/1965 | Flaherty et al. . |
| 3,286,212 | 11/1966 | Thompson et al. . |
| 3,553,878 | 1/1971 | Canon . |
| 3,641,337 | 2/1972 | Bahnsen . |
| 3,742,835 | 7/1973 | Bahnsen . |
| 3,855,946 | 12/1974 | Bales ..................................... 248/188.5 |
| 3,963,156 | 6/1976 | Perrin . |
| 4,278,223 | 7/1981 | Fauteux ................................ 248/125.8 |
| 4,316,592 | 2/1982 | Jeff ......................................... 248/187 |
| 4,403,421 | 9/1983 | Shepherd . |
| 4,580,483 | 4/1986 | Garbini ....................................... 42/94 |
| 4,752,792 | 6/1988 | Keith . |
| 4,864,342 | 9/1989 | Vogt . |
| 4,893,427 | 1/1990 | Davidson ................................... 42/94 |
| 5,333,829 | 8/1994 | Bell et al. .............................. 248/634 |
| 5,347,740 | 9/1994 | Rather et al. ............................... 42/94 |
| 5,360,190 | 11/1994 | Walker et al. ....................... 248/201.1 |
| 5,421,115 | 6/1995 | McKay ....................................... 42/94 |
| 5,491,919 | 2/1996 | Rather et al. .............................. 42/94 |
| 5,515,246 | 5/1996 | Maglica ..................................... 362/72 |
| 5,609,317 | 3/1997 | Glynn et al. ......................... 248/206.5 |

FOREIGN PATENT DOCUMENTS 1065043  5/1954  France .

*Primary Examiner*—Ramon O. Ramirez

[57] ABSTRACT

A mount or rest for a camera, firearm, spotting scope, sextant, or other optical or aiming device comprises a magnetic base for attachment to magnetically attractable surface, such as the a surface of a vehicle, a post extending vertically from the base, a tube telescopically received within the post, and a means for mounting an aiming device comprising a stem telescopically received within the tube. In another aspect, a system for supporting an aiming device is disclosed wherein a base unit is provided that allows for the use of the magnetic stand on a nonmagnetically attractable surface.

22 Claims, 16 Drawing Sheets

MULTI-PURPOSE REST HAVING MAGNETIC BASE

RELATED APPLICATIONS

This application is a continuation-in-part of U.S. application Ser. No. 08/802,298, filed Feb. 18, 1997, now abandoned, which is a continuation-in-part of U.S. application Ser. No. 08/755,532, filed Nov. 21, 1996, now abandoned. Each of the aforementioned applications is incorporated herein by reference in their entireties.

BACKGROUND OF THE INVENTION

The present invention relates to a rest for guns, cameras, spotting scopes, laser devices, sextants, and the like, and particularly, to a rest which comprises a magnetic base for secure anchoring to a ferromagnetic surface such as the hood, trunk, fender, or roof of an automobile.

Rests or mounts find use in a variety of applications, such as photography, e.g., wildlife photography, bird watching, hunting, target shooting, astronomical observations, etc. Typically, cameras such as still, motion picture, and video, are mounted on tripods, which are rendered top heavy, and which are subject to vibrations and shaking from wind, or from manual operation of the camera. Sudden gusts of wind may also cause a tripod to tip over, risking damage to the equipment attached. Tripods are also generally expensive, bulky to transport and time consuming to set up inasmuch as the legs require multiple adjustments to level the head and reach a bit of stability. Tripod feet tend to slide on smooth surfaces and sink into soft surfaces such as soft ground. Additionally, tripods generally require a large surface area to be set up.

Gun rests generally consist of sand bag rests that are difficult to transport and set up due to their bulk and weight. Sand bag rests tend to become hard and non-pliable and thus, are unsatisfactory as an aid in aiming. Bi-pod gun rests that attach to the underside of a rifle forearm are also known in the art, and tend to get in the way of the shooter, e.g., when he is firing "off-hand." Such bi-pods also require a great deal of manipulation and adjustment when used on the hood, trunk, or top of a vehicle. Generally the legs must be adjusted for height in order to plumb the telescopic or open sights of a rifle with the horizon. The feet are generally inadequate and tend to grab and jump on hard surfaces, particularly when the shooter attempts to swing in a horizontal motion to engage his target.

Portable three and four legged platforms or frames are also known. These typically require numerous adjustments before they can be arranged to put the gun on target and can slide on the surface on which they rest, are space consuming, awkward to use, and are not truly stable.

Some rests of the mono-pod or bi-pod type require pointed nail-like protrusions on their feet to be inserted into the ground for stability. Even after being anchored into the ground, such rests are not stable and rock back and forth changing the sight picture as the shooter tries to aim and shoot.

It would, therefore, be highly desirable to provide a rest or mounting device which is extremely stable, inexpensive, simple to set up with minimal effort, small in size and readily transportable, does not hinder or get in the way of the operator, requires a minimum of surface area to set up, and which can be used with all manner of camera devices, firearms, laser and optical devices, and the like.

SUMMARY OF THE INVENTION

It is, therefore, an object of the present invention to provide a rest or mount suitable for photography, hunting, target shooting, or any other activity requiring precise aiming, pointing, etc., which is extremely stable, and which is not prone to the problems associated with conventional gun rests, mounts, shooting frames, and the like, and the problems associated with conventional camera tripods, which are prone to movement, shaking, sliding, tipping, etc. Such stability is achieved by using the weight of the vehicle or other surface on which the rest according to the present invention is placed. Thus, the rest according to the present invention can be considered an extension of the vehicle, or other structure.

It is another object of the present invention to provide a mount or rest that is inexpensive, compact, light in weight, and can be simply and quickly be set up and adjusted without a multiplicity of adjustments, as is required for tripods, which can be painstaking and time consuming to set up.

Still another object of the present invention is to provide an aiming or mounting device which requires a minimum of surface area for set up and which does not get in the way of the operator.

These and other objects are provided by the present invention which comprises a magnetic base for secure anchoring to a magnetically attractable surface, such as a vehicle. The magnetic base is attached to a vertically adjustable leg which is attached to a means for mounting a device such as a gun, camera, or other aiming or pointing device. The vertically adjustable leg is advantageously designed to accept a variety of mounting means.

In a further aspect, the present invention provides a system and method for supporting an aiming device wherein a base unit may be secured to the magnetic stand according to the present invention to provide stable support for the magnetic stand on a nonmagnetically attractable surface.

It is to be understood that both the foregoing general description and the following detailed description are exemplary and explanatory only and are not restrictive of the invention as claimed.

The accompanying drawings, which are incorporated in and constitute a part of the specification, illustrate various embodiments of the invention and together with the general description, serve to explain the principles of the invention.

BRIEF DESCRIPTION OF THE DRAWINGS

The detailed description of the invention may be best understood when read in reference to the accompanying drawings wherein.

DETAILED DESCRIPTION OF THE INVENTION

Figure 1:
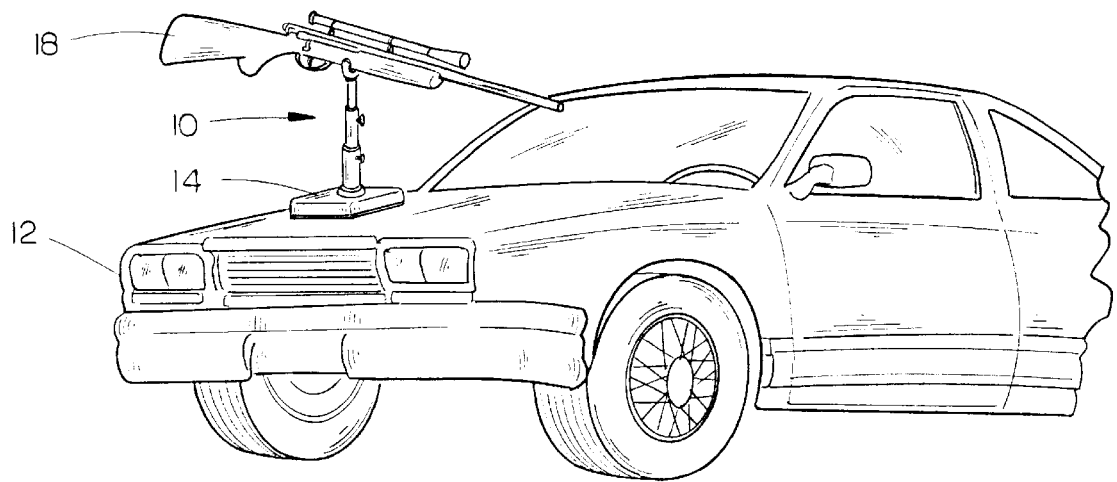
FIG. 1 shows a pictorial representation of the mounting device according to the present invention on the hood of an automobile.

Referring now to the drawings, and particularly to FIG. 1, there is shown a pictorial representation of rest 10 according to the present invention, shown mounted on the hood of car 12. The rest 10 is attached to the car 12 via magnetic base 14. The embodiment of FIG. 1 comprises a U-shaped or wishbone shaped yoke 16 and is shown with rifle 18 mounted thereon.

Figure 4:
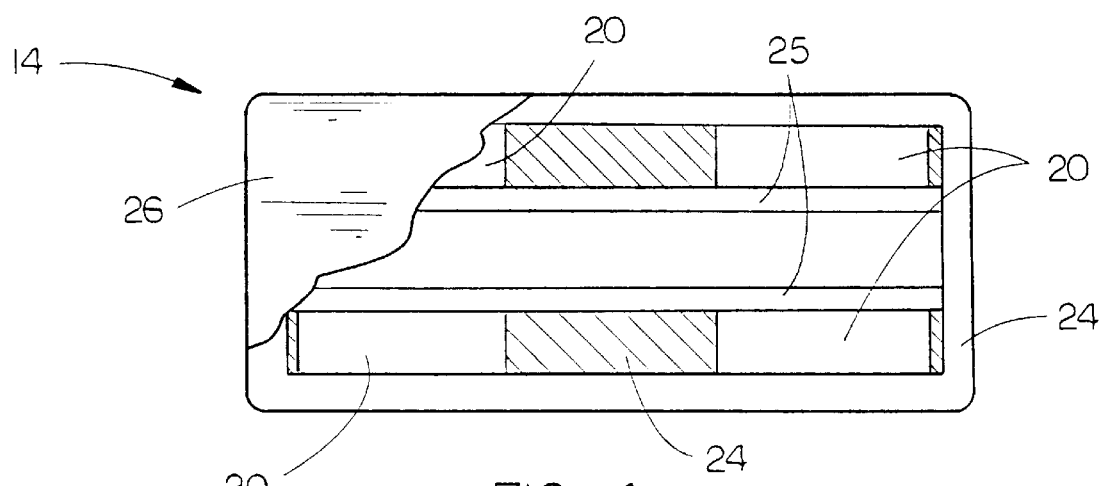
FIGS. 4 and 5 show side cut away view of a magnetic base according to the present invention.

Magnetic base 14 may be of any desired shape, and comprises one or more magnets 20 (see FIGS. 4–6) in an outer housing 24 (see FIG. 4). Although a single magnet may be employed, it is preferable to use two or more. Where a plurality of magnets 20 are employed, they are preferably spaced within the housing to provide a magnetic force over a larger surface area.

The configuration of the magnets 20 should be adapted according to the strength and number of the magnets 20 used. The strength and configuration of magnetic base 14 to the surface should be strong enough to provide the maximum degree of safety, i.e., to prevent tipping or sliding which may cause not only marring of the automobile's surface or damage to cameras, rifle scopes, and other costly equipment. Additionally, accidental tipping or slippage may cause accidental firing, which presents a danger to persons and property. Yet, at the same time, magnetic force should be within a range that allows the rest 10 to be conveniently removed from the surface when not in use. To this end, magnets 20 are preferably mounted in an elongate, and generally rectangular housing, wherein base will remain stable under the maximum torques that will likely be encountered during use, but that will enable the user to readily remove the unit after use by manually grasping the top of rest 10 and tipping it in a direction perpendicular to the length of the elongate housing. The greatest torques will likely be from gusts of wind pressure on the gun or camera equipment mounted on rest 10, or from movement or redirection of an attached unit, e.g., as when a shooter swings a rifle horizontally in rapid fashion to engage a target.

Magnetic base 14 preferably comprises a covering 26. Covering 26 may be of any material suitable to prevent marring of a vehicle's finish, particularly as rest 10 is placed on and removed from the vehicle. Examples of such materials include felt or other fabrics, plastic, natural or synthetic rubber, polymeric foams, and the like. Covering 26 is preferably a material which provides a high degree of friction to prevent sliding. In another embodiment (not shown), the protective base may itself form a suction cup, or may further comprise one or more suction cups, for additional stability.

Rest 10 is shown mounted on the hood of a car, although any other generally flat surface of a vehicle, such as the trunk, roof, etc., may be used. Rest 10 may also be adapted for use with a shooting bench or other horizontal structure comprising a nonferromagnetic material, such as wood, when used in conjunction with a ferromagnetic material, such as a steel plate, which may be resting, affixed, or otherwise mounted thereon.

Figure 2:
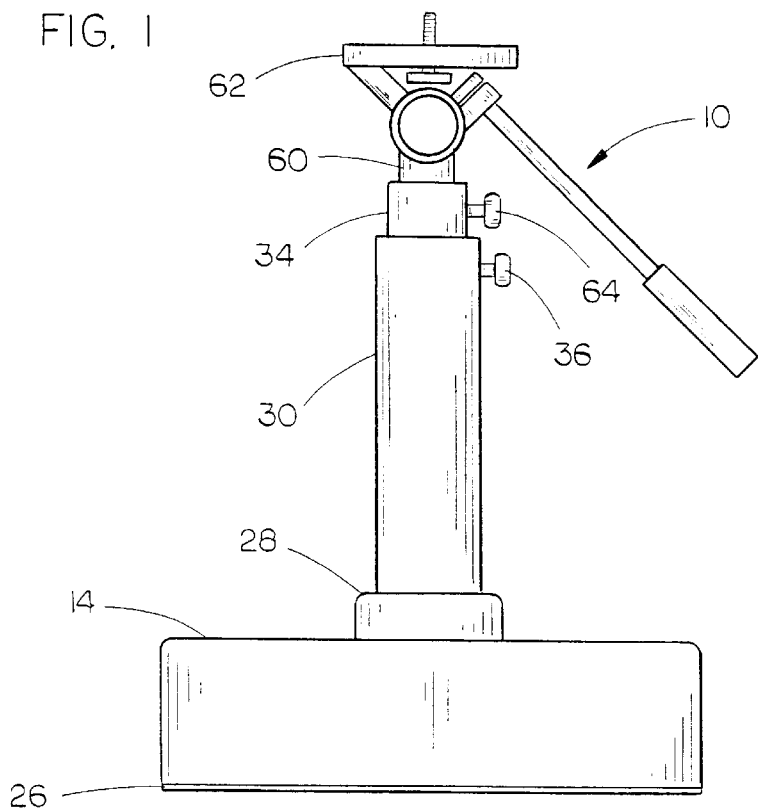
FIG. 2 shows a pictorial view of the device according to the present invention with a camera mount.
Figure 3:
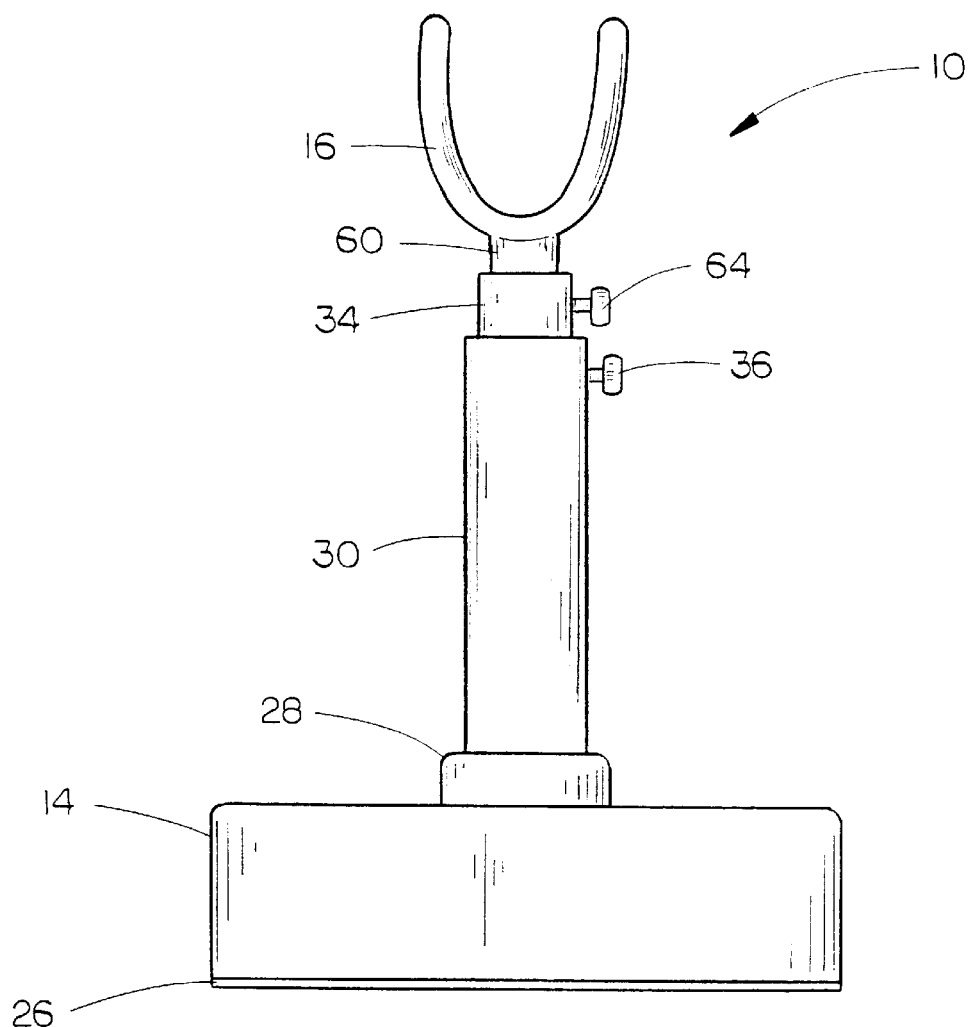
FIG. 3 shows a pictorial view of the device according to the present invention having a U-shaped bracket for mounting a firearm.

FIGS. 2 and 3 show rest 10 according to the present invention adapted for use with a camera and firearm, respectively. Although the primary uses of the rest according to the present invention is for a rifle rest or camera mount, the invention is not limited thereto. Any other device which is aimed, pointed, or otherwise trained, focused, leveled, or directed onto a subject may be employed with the rest 10 according to the present invention. For example, firearms, including rifles handguns, machine guns, mortars, etc., may be employed. The present invention finds wide utility as a firearm rest, including hunting, target shooting, military and police use and training. For photography, any type of camera, including still, moving, and video cameras may likewise be employed. Laser pointing devices, spotting scopes, telescopes or other ocular devices, sextants, survey equipment, and the like may also be employed with the rest 10 according to the present invention.

Magnetic base 14 comprises a mount 28 thereon located on its upper surface. Mount 28 securely engages post 30. Preferably mount 28 comprises a threaded bore and receives a compatible threaded end on post 30, although other arrangements may be utilized. For example in embodiments not shown, the base of cylindrical post may have one or more resilient protrusions, e.g., a spring loaded protrusion, which engage complimentary depressions within the cavity of mount 28, and wherein the cavity of mount 28 may optionally further comprise a groove or grooves for guiding the resilient protrusions into the depressions. Alternatively, mount 28 may be omitted and post 30 may be fastened directly to magnetic base 14, e.g., via a bolt, welded joint, etc.

Figure 7:
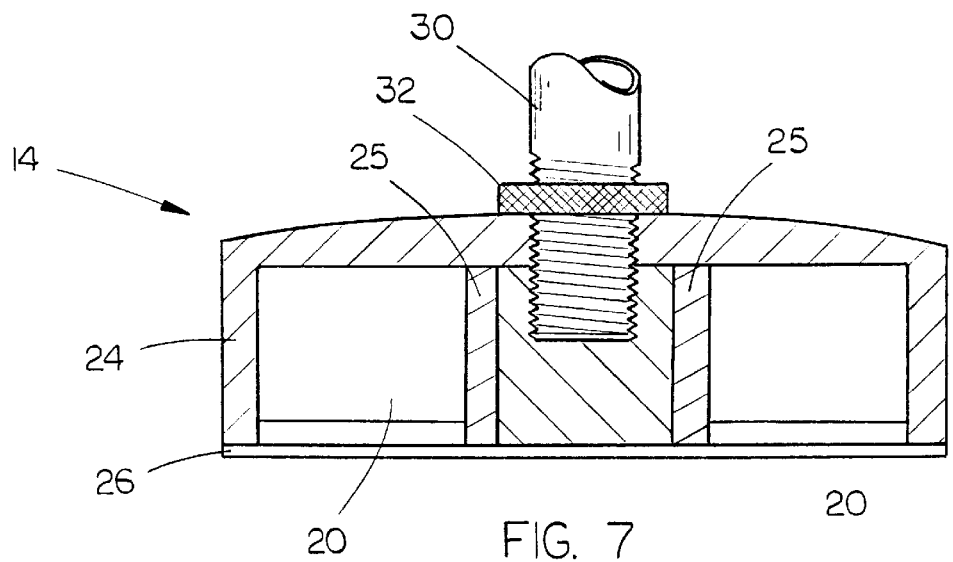
FIG. 7 shows a method of attaching a vertically adjustable leg within a magnetic base employing a threaded locking sleeve.

The mount 28 is securely fastened to magnetic base 14, and may be fastened for example, via a bolt, welded juncture, and the like. Alternatively, as illustrated in FIG. 7, the threaded bore for receipt of threaded end of post 30 may be formed directly within the upper surface of the housing 24 of magnetic base 14, and may be secured by a threaded locking sleeve 32 on the threaded end of post 30 which may be tightened against the upper surface of housing 24 to prevent motion of post 30.

In an embodiment not shown, mount 28 and post 30 may form an adjustable assembly, for example, a ball and socket assembly adjustable in all directions, or a joint comprising meshing geared teeth allowing a fine degree of rotation in a single direction, which may be advantageous for adjusting the rest 10 so that it is plumb on a vehicle surface which is not horizontal, e.g., sloping or curved.

The upper end of post 30 telescopically receives tube 34. The position of tube 34 is axially adjusted to a desired height within post 30 and is held in place at the desired height by tightening thumbscrew 36.

Figure 10:
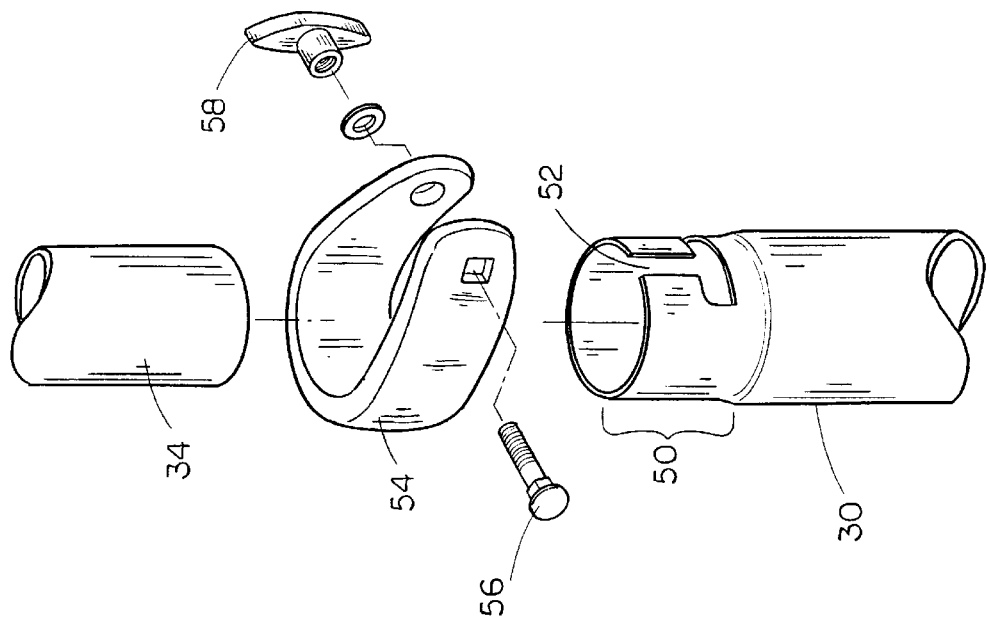
FIGS. 9 and 10 show alternative methods of retaining a vertically adjustable tube within a post.
Figure 9:
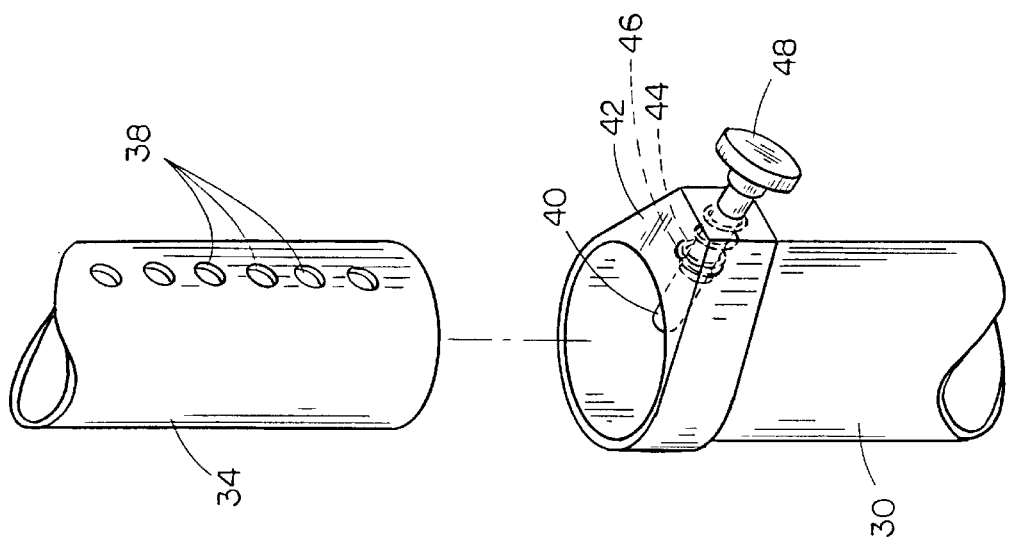

FIGS. 9 and 10 demonstrate alternative methods of holding tube 32 in place within post 30. In FIG. 9, shown in exploded view, tube 30 comprises a plurality of spaced holes or depressions 38 along its length wherein the user selects the hole or depression corresponding to the desired height and engages the selected hole or depression with retaining pin 40. In the particular embodiment shown, retaining pin 40 is enclosed in retaining pin housing 42. Spring 44 is attached to retaining pin 40 and is attached to spring washer 46 mounted on retaining pin 40, such that retaining pin 40 is urged inwardly by spring 44. Handle 48 attached to retaining pin 40 is used to disengage retaining pin 40 from spaced holes 38.

In FIG. 10, shown in exploded view, the upper portion 50 of post 30 comprises a cutaway relief area 52 and sleeve 54 mounted thereon. The tube 34 may be secured at a fixed position within post 30 by tightening sleeve 54 via bolt 56 and T-handle nut 58, thereby compressing upper portion 50 of post 30 around tube 34. In an embodiment not shown, a plastic bushing with a similar cutaway relief area may be fitted within upper portion 50 of post 30. Also within the scope of the present invention is any other conventional means for providing a vertically adjustable leg, such as threaded collar engaging a compressible bushing (see FIGS. 18–21) as is commonly employed for microphone stands and extensible tripod legs, and the like.

Referring now to FIGS. 2 and 3, the upper end of tube 30 accepts stem 60 of a gun mount, camera mount, etc. FIG. 2 demonstrates one of the preferred embodiments of the present invention wherein a camera mount 62 is employed. The camera mount 62 may be of any conventional type utilized on tripods and the like, and in a preferred embodiment, is of the type that swivels horizontally and vertically. A ball and socket universal joint assembly may likewise be employed (not shown). In addition to still photography, the rest 10 according to the present invention is also useful for motion picture photography and video photography.

FIG. 3 shows rest 10 according to the present invention adapted for use with a firearm, wherein tube 34 retains stem 60 of U-shaped yoke 16. In one embodiment according to the present invention, U-shaped yoke 16 may be covered, padded, or coated, e.g., to prevent marring the rifle's finish and/or to provide a secure engagement between the yoke 16 and the firearm. For example, the yoke may be rubber or plastic coated metal, or may have a fitted sleeve, such as, plastic or rubber tubing, e.g., surgical tubing and the like, cloth, fur, sheepskin, and the like.

The U-shaped portion of yoke 16 may be a single piece of rigid material, such as metal, wood, plastic, fiberglass, composite materials, etc., and in an embodiment not shown, may comprise adjustable hinged, pivoting, or otherwise movable arms which may clamp onto a firearm or other device.

In an alternative embodiment, yoke 16 may also comprise an elongate cradle for holding the forearm of a rifle.

In another embodiment, not shown, the top of the stem 60 may attach to the U-shaped portion of the yoke 16 via a hinge or pivot which permits vertical aiming of the aiming device. If desired, the hinge or pivot may be adjustable to provide fixing the yoke at a desired degree of vertical rotation and/or the range of vertical rotation may be limited to provide relief for a limited range of motion to prevent mounted equipment from falling when left unattended.

In yet another embodiment, the yoke may further comprise a fixture for holding the butt or stock of a firearm. The means for securing the stem 60 within tube 34 is shown as thumbscrew 64, however, any other method for securing the stem 60 within tube 34 may be employed, including a retaining pin, compressible sleeve, etc., for example, as described in FIGS. 9 and 10 in conjunction with retaining tube 34 within post 30. The means for retaining tube 34 within post 30 and the means for retaining stem 60 within tube 34 may be the same or different. In an embodiment not shown, the base of stem 60 may comprise a ball which engages a socket attached to tube 34 to form an universal joint assembly.

Thumbscrew 64 (or other retaining means) is an optional feature, especially wherein the intended use of rest 10 is for hunting. Generally, the hunter will want the yoke 16 to remain freely rotating so that a firearm may swing horizontally, if necessary, to engage a target. Similarly, there may be occasions where the photographer will desire the same freedom of rotation. The weight of the equipment mounted on rest 10 will generally be sufficient to prevent upward vertical movement if stem 60 is left freely rotating. The versatility and flexibility of rest 10 is increased by inclusion of a retaining means for stem 60, and it is preferred to include a retaining means which may conveniently be left unengaged, but which may be engaged if so desired by the user, e.g., for target shooting, photography, etc.

Figure 11:
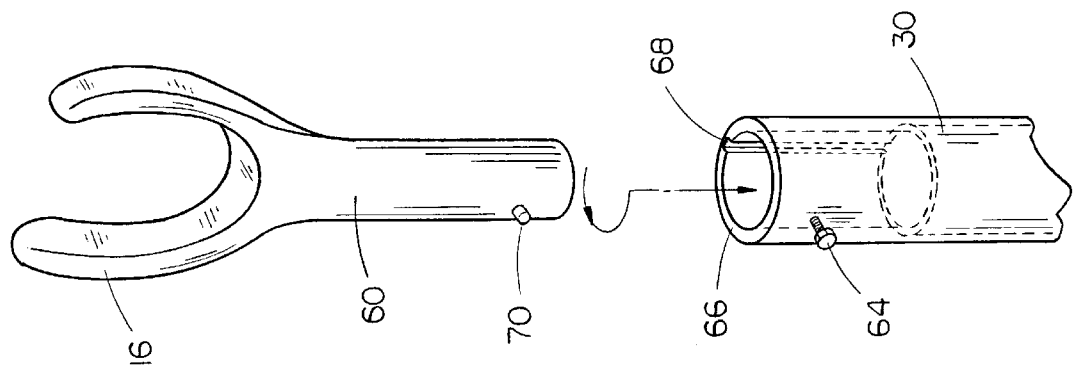
FIG. 11 shows a rest according to the present invention wherein a rifle yoke or other mounting device may be retained within a vertically adjustable leg while at the same time allowing free 360° rotation.

Because there are many instances where it is advantageous to allow stem 60 to rotate freely, it is desirable to employ a retention means which at the same time allows free rotation of stem 60 within tube 34. FIG. 11 shows a preferred embodiment wherein stem 60 may be allowed to freely rotate, but wherein a retaining means will generally prevent stem 64 from accidently falling out, e.g., when the unit is removed from a vehicle's surface and is being transported. FIG. 11 shows tube 34 with an inner sleeve 66 which contains an axial groove or key way track 68 running axially. The axial groove 68 corresponds with a protrusion 70 near the base of stem 60. The sleeve extends from the top of tube 34 to a depth within tube 34 that is sufficiently shallow such that protrusion 70 will extend beyond the sleeve when the stem is fully extended within tube 34 thus allowing free rotation, while at the same time preventing removal of the stem 60, e.g., during transport of the device, unless the protrusion 70 is first aligned with groove 68.

Figure 12:
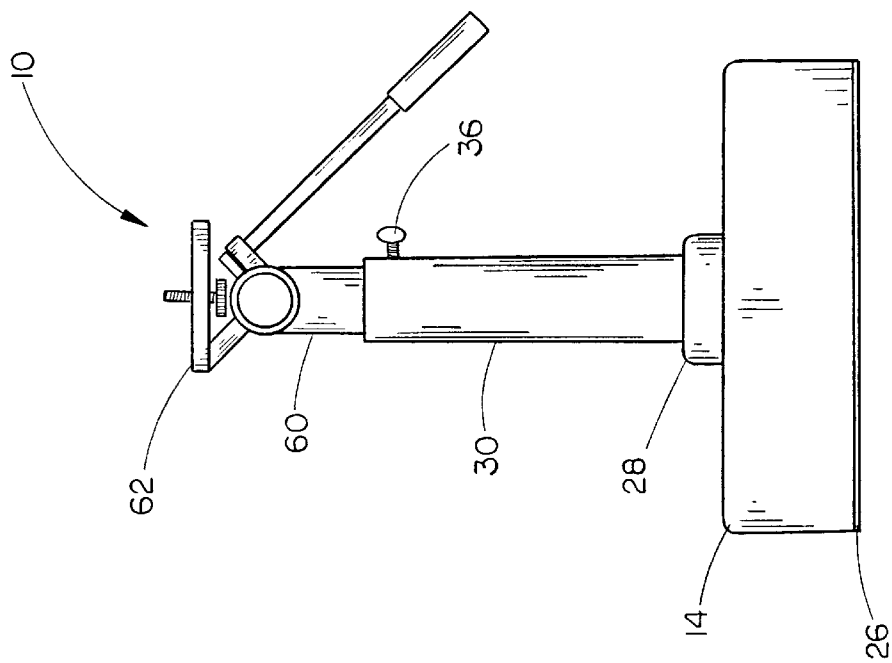
FIG. 12 shows an embodiment according to the present invention wherein the stem of an equipment mount directly engages a post attached to a magnetic base.

FIG. 12 demonstrates yet another embodiment of the present invention, similar to FIG. 2, wherein tube 30 (FIG. 2) is not present, and vertical adjustment of rest 10 is obtained by engaging stem 60 with thumbscrew 36 of post 30.

Figure 5:
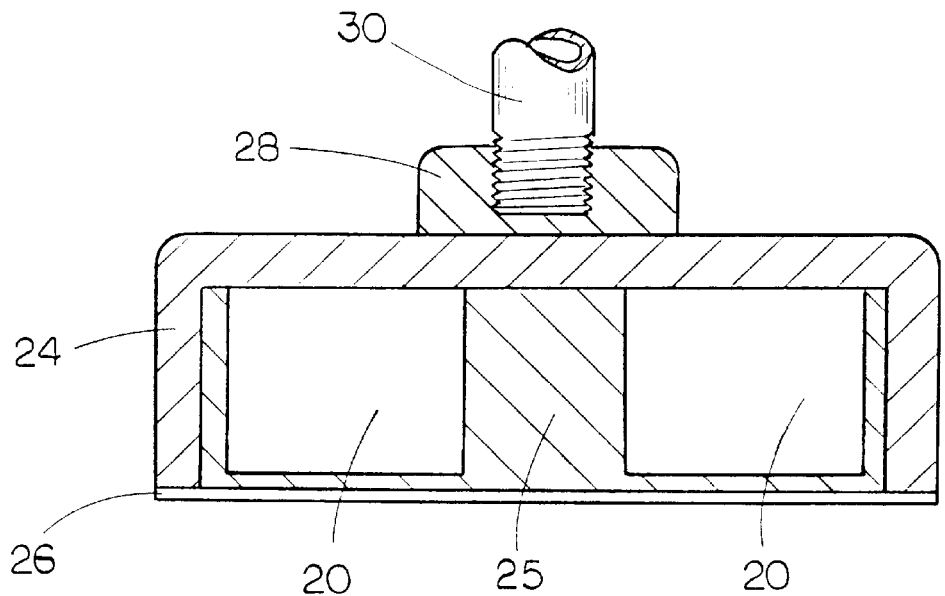
Figure 6:
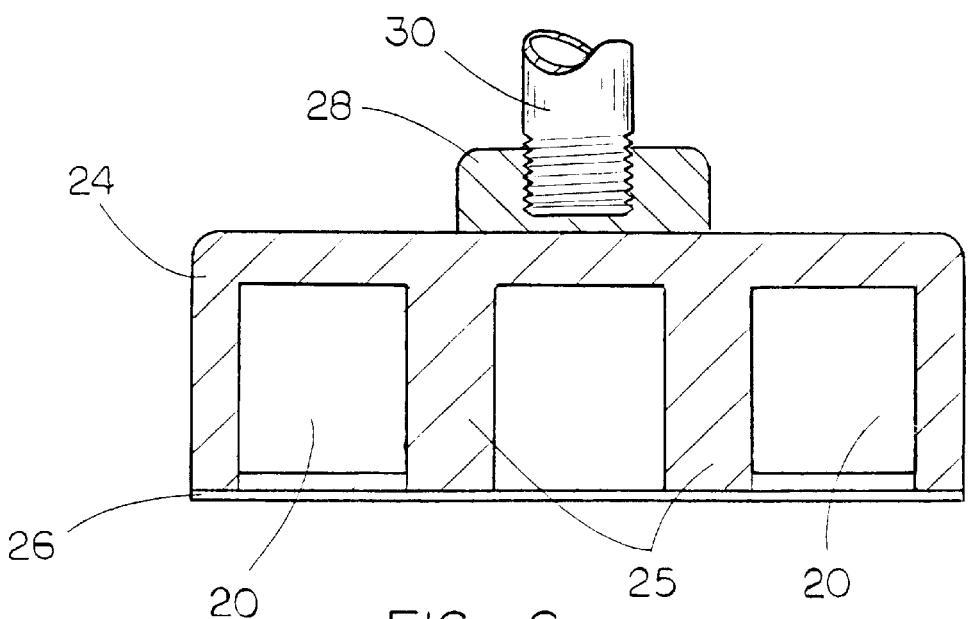
FIG. 6 shows a bottom cut away view of a magnetic base according to the present invention.

FIGS. 4–6 show a preferred magnetic base 14 according to the present invention. FIG. 4 is a bottom view, with protective cover 26 shown in partial cutaway, outer housing 24 and partitions 25 rigidly attached to housing 24, and magnets 20. Magnets 20 may be retained within the base 14 via adhesives, such as epoxy resin adhesives, retaining pins which engage a complimentary hole or indentation within magnets 20, retaining posts, stops, bars, and the like, securing magnets 20 within housing 24. Alternatively, when the housing is steel, iron, or other ferromagnetic substance, the magnet's (20) own attraction to housing 24 and partitions 25 can be sufficient for retention of magnets 20 within housing 24. Although magnetic base 14 is depicted as being rectangular in shape, any of any other desired shape, such as circular, oval, triangular or other polygonal shaped, "Y" shaped, "X" shaped, "T" shaped, or may otherwise be irregularly shaped, etc., and may employ single or multiple magnets which likewise may be of varying shapes and sizes.

Although FIGS. 4–6 depict multiple magnets 20 in a single base 14, in an alternative embodiment, not shown, multiple magnets may be employed in multiple separate legs. Thus, a magnetic base employing two magnets could comprise either a single base housing each magnet, or bi-pod base with one magnet in each leg. Similarly, a base with three, four, etc., legs could be used. In the embodiments according to the present invention employing multiple legs, each leg may be fixed in length or may be adjustable. Individually adjustable legs are advantageous for use on a vehicle surface which is not level, in that the user can adjust rest 10 so that it is substantially plumb. Where the magnetic base comprises multiple legs, they may preferably be hinged or otherwise foldably attached with respect to post for compact storage and ease of transport.

Figure 8:
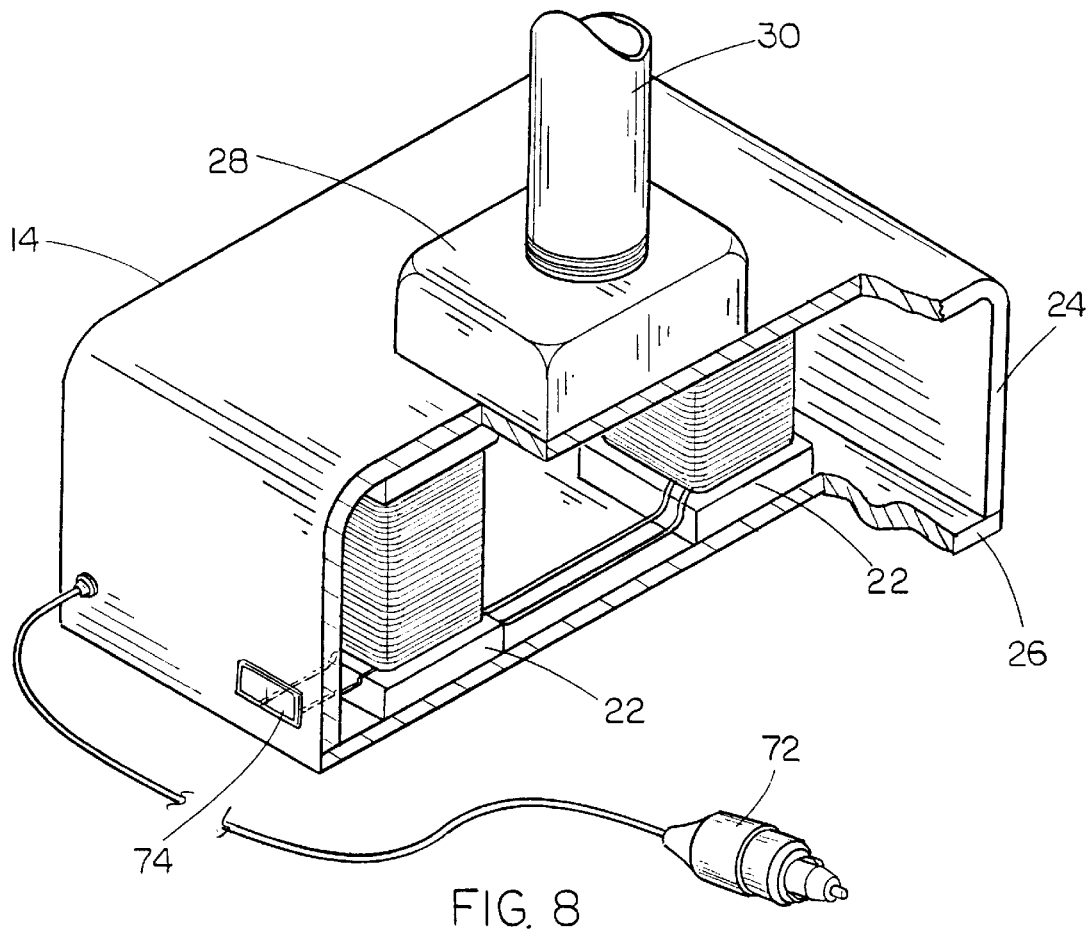
FIG. 8 shows a rest according to the present invention employing electromagnets.

Electromagnets may also advantageously be employed in magnetic base 14 according to the present invention. FIG. 8 depicts an embodiment according to the present invention comprising electromagnets (e.g., solenoidal inductors) 22 in magnetic base 14. Electromagnets 22 preferably comprise a core of iron, steel, or other ferromagnetic material for an increased magnetic field. Electromagnets 22 conveniently may employ direct current from a vehicle's electrical system, e.g., via a cigarette lighter adapter 72, although alternating current may also be employed. An advantage of employing an electromagnet is that a very secure magnetic attraction may be provided, allowing secure mounting that is very resistant to sliding or tipping, yet is easily removed from the vehicle surface simply by discontinuing the current. A magnetic base employing a combination of ferromagnetic magnets and an electromagnet may likewise be employed. Employing a combination of permanent magnet and electromagnet has a safety advantage of a providing an very secure attachment while current is applied to the electromagnet, while allowing easier removal when current to the electromagnet is disconnected than would be possible where the total magnetic field is provided by the permanent magnets alone, and at the same time requires less current and thus, drain on a vehicle's battery, than would be required to provide the same strength magnetic field via an electromagnet alone. Where multiple electromagnets are employed, they may be connected in series or in parallel, and may employ one or more resistors to achieve the desired current. Rest 10 is shown with a switch 74 for turning current on and off. In an alternative embodiment not shown, a variable resistor may also be employed to adjust the strength of the magnetic field, which may be used to adjust for the composition, e.g., the amount of iron, of the alloy used in the vehicle surface.

Figure 13:
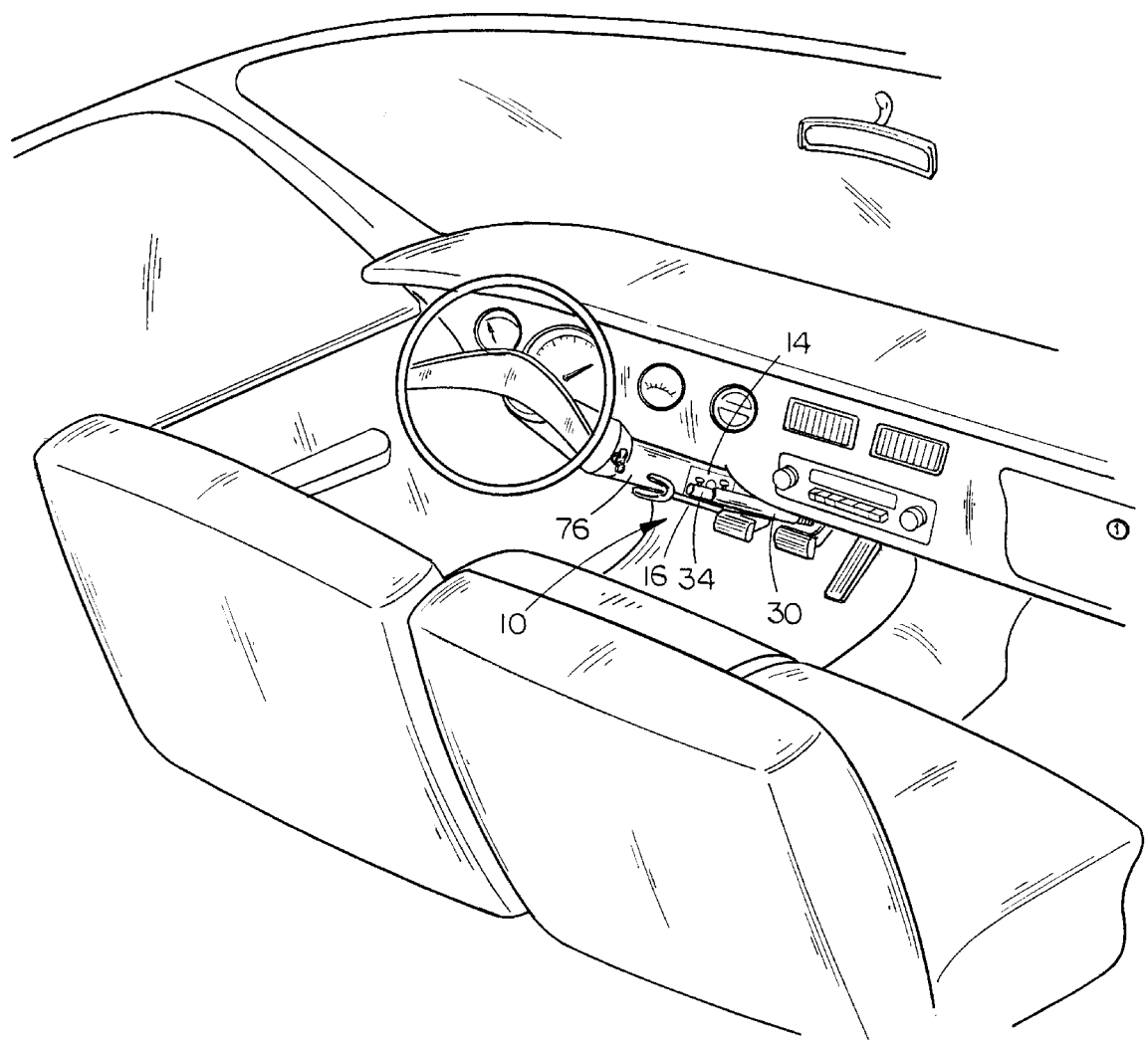
FIG. 13 shows a preferred embodiment according to the present invention which may be stored under the dash of a vehicle.

FIG. 13 depicts a preferred embodiment wherein rest 10 according to the present invention may be conveniently stored under the dash of an automobile. Yoke 16, post 30, and tube 34 are depicted as being magnetically adhered to base 14 which, in turn, may be magnetically adhered to steering column 76 thereby providing convenient storage and transportation of rest 10 until ready for use.

Figure 14:
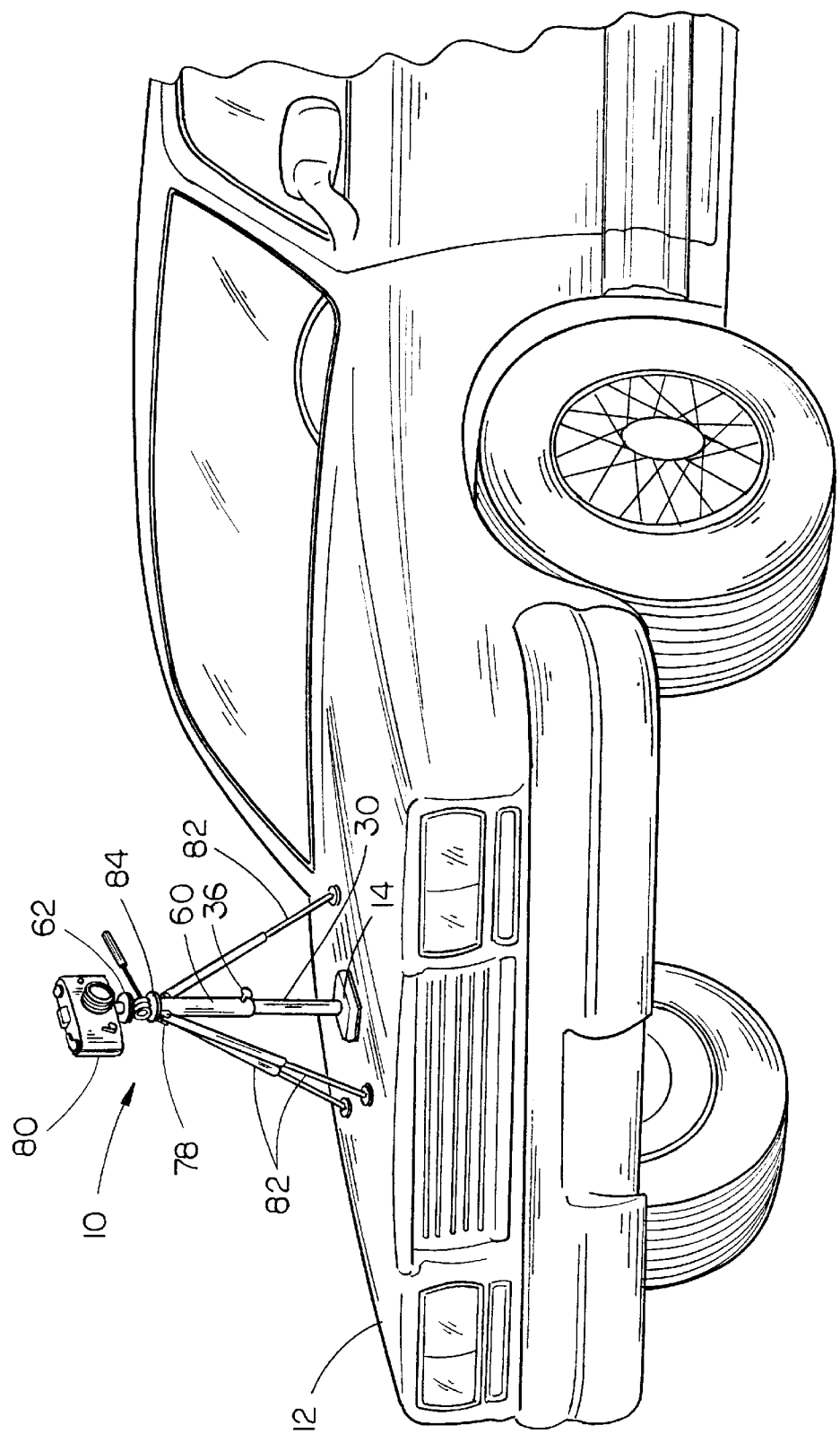
FIG. 14 shows another preferred embodiment comprising additional adjustable legs allowing the rest according to the present invention to be used as both a magnetic rest and as a tripod.

FIG. 14 depicts yet another preferred embodiment according to the present invention comprising magnetic base 14, post 30, and a camera tripod 78. Camera tripod 78 may be of the type having three or more extensible legs 82. Stem 60 of tripod 78 is mounted telescopically on post 30 and may be secured by thumbscrew 36. Post 30 is depicted as being accepted axially within stem 60, however, the configuration may also be reversed such that stem 60 is received within post 30 (not shown). The embodiment shown in FIG. 14 is especially advantageous in that it allows rest 10 according to the present invention to be used as a magnetic rest and as a conventional tripod on a nonmagnetically attractable surface. In FIG. 14, rest 10 is depicted with camera mount 62 having camera 80 mounted thereon. Tripod legs 82 are shown retracted to allow contact between magnetic base 14 and the hood of car 12. Tripod legs 82 may likewise optionally be extended to rest on car 12 to provide additional stability if desired, or alternatively, may be retracted and folded inward (not shown) toward stem 60. Rest 10 may be removed from car 12 whereby tripod legs 82 may be extended, thus allowing rest 10 to additionally function as a conventional tripod on a nonmagnetically attractive surface. Where freestanding support of the aiming device is not necessary or desired, a mono- or bi-podal arrangement may be substituted for the tripod arrangement by providing one or two extensible legs, respectively, instead of three or more.

Tripod legs 82 are depicted as being attached to the upper portion of stem 60, however, tripod legs may be attached or secured at any position thereon. In a preferred embodiment, tripod legs 82 are attached to a collar 84 which is axially moveable along the length of stem 60 and comprises means (not shown) for affixing collar 84 at any desired position along the length of stem 60.

Although the embodiment of FIG. 14 is described in reference to use with camera 80, it is understood that the rest 10 of FIG. 14 may likewise be employed with motion picture or video equipment and the like (not shown), or may be adapted for use as a gun mount by exchanging camera mount 62 with a gun mount or rest (not shown) such as a yoke 16 and the like.

Figure 15:
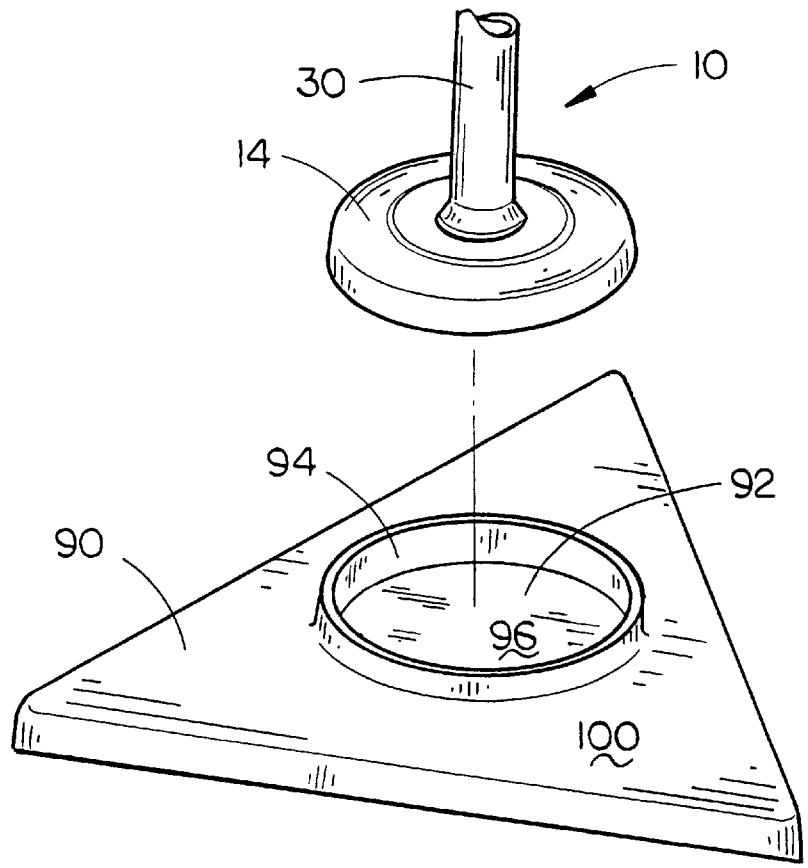
FIGS. 15–19 depict various embodiments of the present invention wherein a relatively large base is employed to allow use of the stand on surfaces which are not magnetically attractable.
Figure 16A:
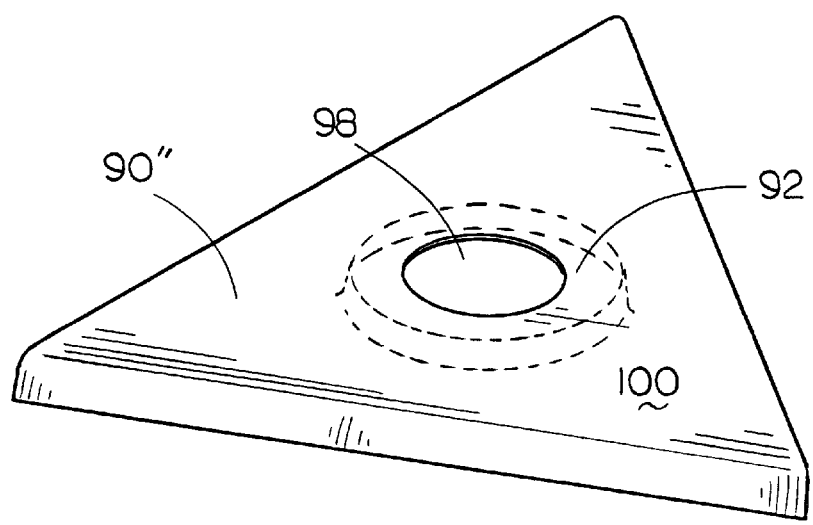
Figure 16B:
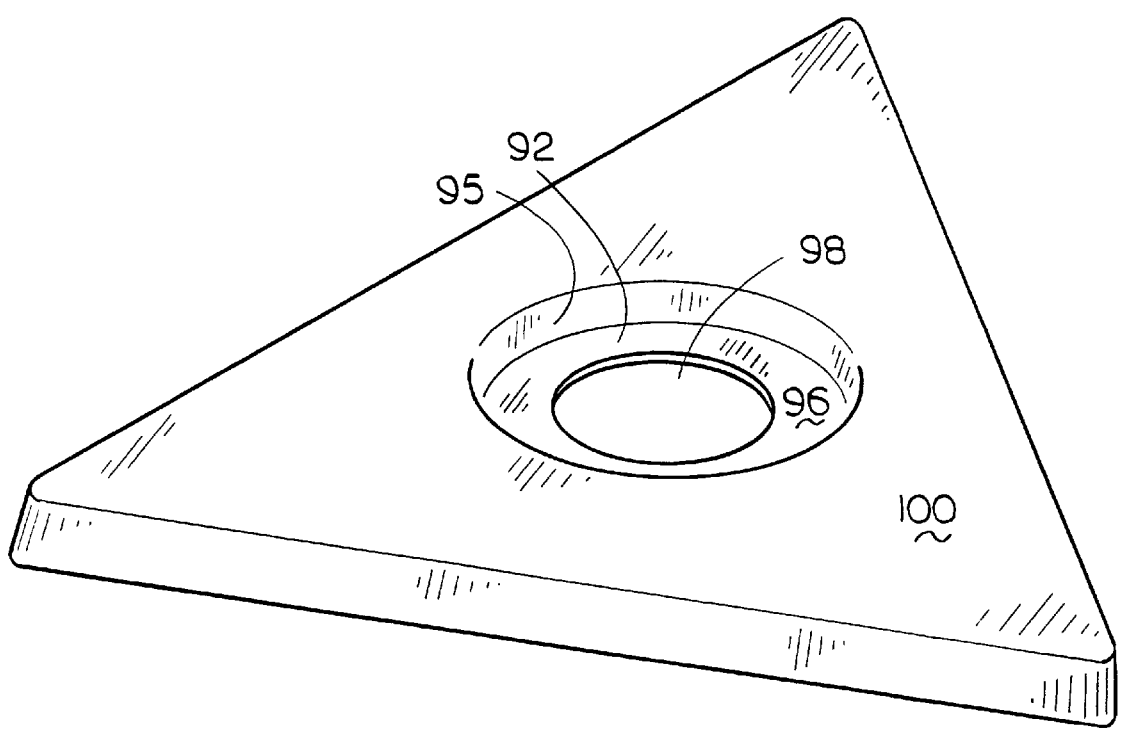

FIGS. 15, 16A, and 16B depict exemplary embodiments of the present invention wherein a base 90,90', or 90" (see FIGS. 15, 16A, and 16B, respectively) for receiving the magnetic stand 10 is employed to provide retention of the magnetic stand 10 to allow use of stand 10 on a surface which is not magnetically attractable. Stand 10 may be any of the embodiments shown or described herein. The non-magnetically attractable surface may be any surface on which it may be desirable to support a firearm, camera, or other aiming device as described herein. Such nonmagnetically attractable surfaces include, but are not limited to, tabletops, benches, floors, the ground, pavement, and the like.

The magnetic stand 10 may be secured to the base 90 or 90" via magnetic base 14 by inserting base 14 into opening 92 which is sized to receive magnetic base 14. Although the base for receiving the magnetic stand will be shown and described herein primarily in reference to a generally triangular base, it will be recognized that the present invention is not limited to such and may be any desired shape, including circular, rectangular, or any other polygnal or other desired shape. The area occupied by the base for receiving magnetic stand should be larger than that of magnetic base 14, and should be sufficiently large to provide a stable support of the desired aiming device at the desired height and under the desired conditions. Obviously, a larger base will provide greater stability, and the size of the base for receiving magnetic stand that is necessary to provide sufficient support for a stand 10 in accordance with the present invention will depend on the weight, size, and weight distribution of the aiming device to be supported, the weight of the material from which larger base is constructed, the height to which stand 10 may be extended, the environmental conditions such as wind, the flatness and/or levelness of the surface on which the large base will be placed, and so forth. Obviously, a larger and heavier base will provide greater stability, but as the base becomes larger and heavier, the portability of the unit decreases. Thus, the size of the base will depend on the above factors affecting stability and such factors should be balanced with the competing concerns of the degree of portability needed or desired.

In the embodiment shown in FIG. 15, opening 92 is formed by a raised wall 94 to form a peripheral opening to receive base 14. Opening 92 further comprises a base or stop member 96 to retain magnetic base 14 and to prevent it from passing completely through opening 92. Although in the embodiment of FIG. 15 a single base member 96 of opening 92 is shown completely enclosing the bottom of opening 92, it will be recognized that base member 96 may comprise a material with one or more openings, or, base member 96 may be replaced with a plurality of members to act as stops. For example, in the embodiment of FIG. 16B, a base member 96' may be employed that extends into opening 92 sufficiently far to act as a stop to prevent magnetic base 14 from passing completely through opening 92.

Base member 96 may be generally flush with upper surface 100, or alternatively, base member may be recessed with respect to upper surface 100.

Referring now to FIG. 16B, there is shown an embodiment of the present invention wherein base 90" for receiving a magnetic rest 14 (see FIG. 15) in accordance with the present invention is shown with a recess or cavity 92' formed within upper surface 96 of the base 90". The recess or cavity 92' is sized so that the peripheral wall 95 formed within cavity 92' receives magnetic base 14 (see FIG. 15).

Referring now to FIGS. 15, 16A, and 16B, the base for receiving magnetic stand may be formed from materials including, but not limited to, woods, metals, composite materials, and so forth. In one embodiment, the base 90, 90' may be fabricated from a high strength and/or high impact polymer material as are generally known to those skilled in the art. In one embodiment, the base 96 of opening 92 or 92' is integrally formed with base 90 or 90". In another embodiment, the base 96 of opening 92 or 92' is formed separately from base 90 or 90". If the base 96 of opening 92 or 92' is formed separately from base 90 or 90", it may be fabricated from a material which is the same as or different from the remainder of large base 90 or 90".

Referring now to FIGS. 15 and 16B, the retention of magnetic base 14 within opening or cavity 92 or 92' may be accomplished by a number of methods. In one embodiment, the dimensions of peripheral walls 94 or 95 and the magnetic base 14 to be retained therein may be sufficiently closely toleranced to provide a secure fit there between. In another embodiment, the secure retention of magnetic base 14 within opening or cavity 92 or 92' may be accomplished by one or more resilient (e.g., spring biased or otherwise compressible or resilient) protrusions (not shown) on the surface of the magnetic base which engage complimentary depressions (not shown) on the surface of wall 94 or 95. Similarly, in yet another embodiment, the secure retention of magnetic base 14 within opening or cavity 92 or 92' may be accomplished by one or more resilient (e.g., spring biased or otherwise compressible or resilient) protrusions (not shown) on the surface of wall 94 or 95 which engage complimentary depressions (not shown) on the surface of the magnetic base.

In still another embodiment, the magnetic base 14 and wall 94 or 95 may comprise complimentary mating threads (not shown) to provide a screw type retention of the magnetic base 14 within the large base 90 or 90". In a similar embodiment, one or more protrusions on magnetic base (not shown) may be aligned to engage one or more complimentary grooves or channels, such as one or more generally L-shaped grooves or channels, formed on the surface of wall 94 or 95. Alternatively, one or more grooves or channels, such as one or more generally L-shaped grooves or channels, could be formed on the surface of magnetic base 14 and complimentary protrusions could be formed on the surface of wall 94 or 95.

Alternative embodiments of the large base 90 and 90" are provided wherein a secure or mating fit between the magnetic base 14 and the wall 94 or 95 is optional. In one embodiment, the base 96 may comprise a magnetically attractable material, thereby providing a secure fastening of the magnetic base 14 within opening 92 or 92'. For example, base 96 of opening 92 or 92' may comprise a magnetically attractable plate that may be, for example, molded within or otherwise fastened to the large base 90 or 90".

Referring now to FIG. 16A, there is shown a base 90' having an opening 98. Depending on the thickness of base 90', an optional cavity 92 may be present. In this manner, base 90' may be juxtaposed between magnetic base 14 (FIG. 15) and a magnetic or magnetically attractable object (not shown) such as a metal plate or the like. The magnetic or magnetically attractable object (not shown) occupying opening 98 could be removable, permanently adhered or otherwise attached to base 90', could be integrally formed, embedded, or molded within base 90'.

In an embodiment not shown, base 90' may simply be a flat surface having an area larger than magnetic base 14 and wherein all or some of the surface is magnetically attractable.

In one embodiment, the base for receiving the magnetic stand according to the present invention further comprises on the bottom thereof padding (not shown) or a plurality of feet (not shown), which may be rubber, plastic, foam, or the like. The padding or feet are preferably non-marring and may be employed to provide increased stability and traction and to protect the surface on which it is used.

Figure 17:
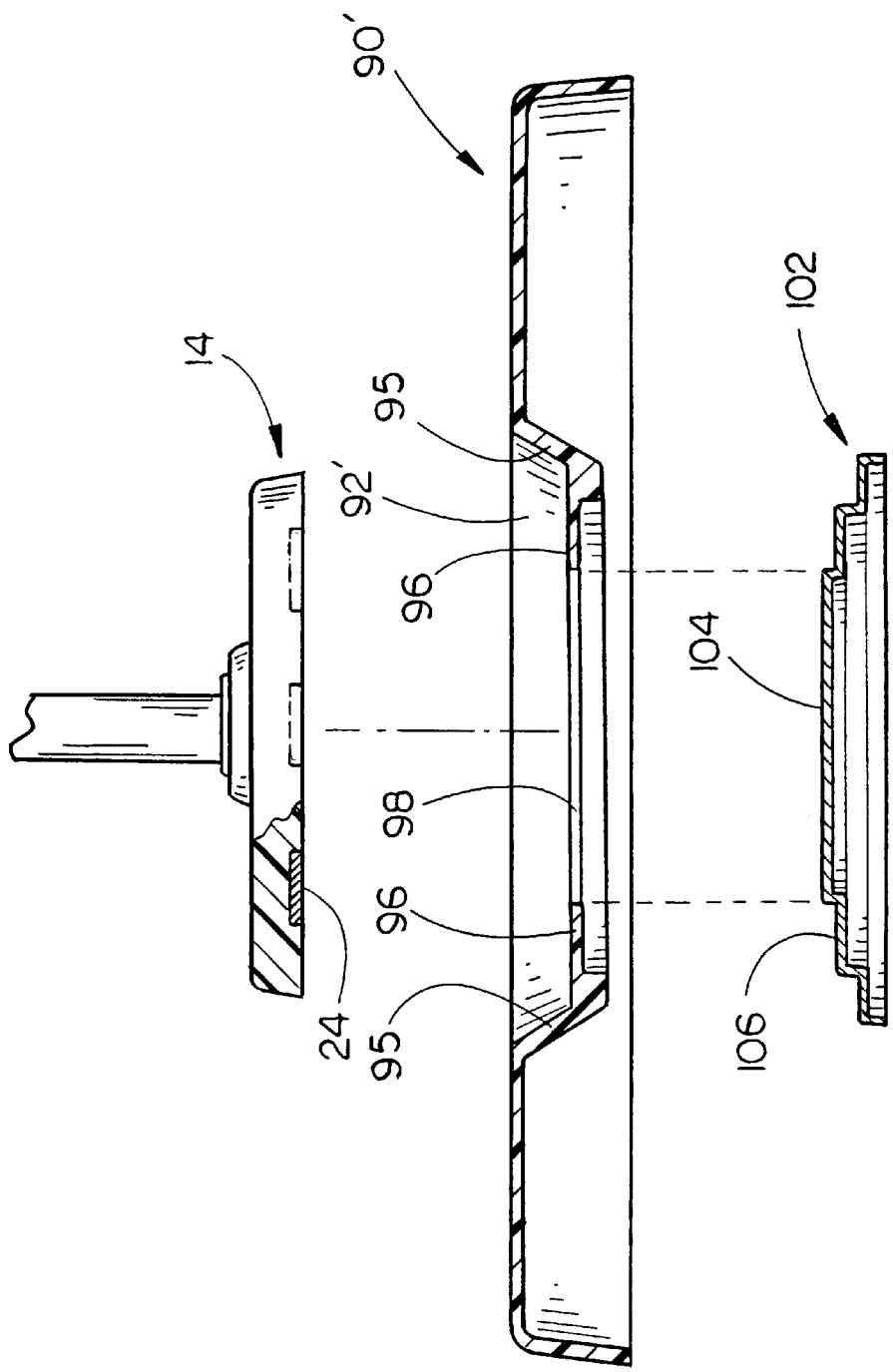

Referring now to FIG. 17, there is shown a cross-sectional view of a particularly preferred embodiment of the present invention wherein retention of magnetic base 14 within plastic base 90", similar to that shown in FIG. 16B, is secured via a clamping action between at least one magnet 24 within magnetic base 14 and a removable magnetically attractable plate 102. In a preferred embodiment, magnetic base 14 comprises a plurality of magnets 24. Magnetically attractable plate 102 is preferably iron or and iron base alloy, such as steel. In another embodiment, plate 102 comprises another magnet. Magnetic base 14 rests within a cavity or recess 92' (see FIG. 16B) that is formed within base 90" by peripheral wall 95. The bottom surface of magnetic base 14 abuts member 96 having opening 98 formed therein. The retention of the magnetic base 14 within the cavity 92' of base 90" is accomplished by the attractive force between the magnets 24 and the magnetically attractable plate 102. In the embodiment shown, the plate is shaped to form an upper surface 104 of plate 102 that is sized to fit within opening 98, thus allowing plate 102 to physically contact the bottom surface of magnetic base 14 and to simultaneously allow region 106 of plate 102 that is peripheral to upper surface 104 to physically abut retention member 96.

Figure 18:
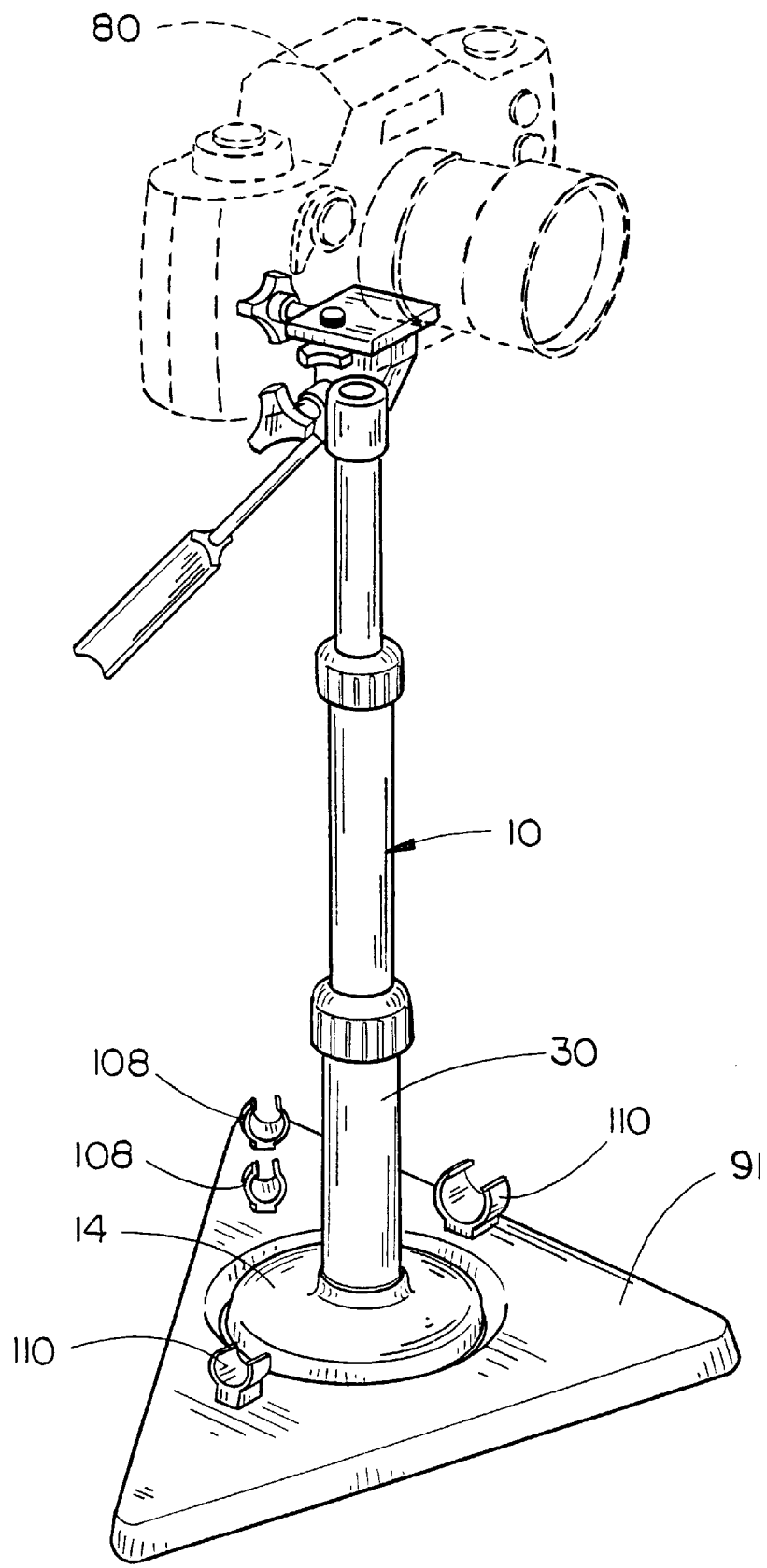
Figure 19:
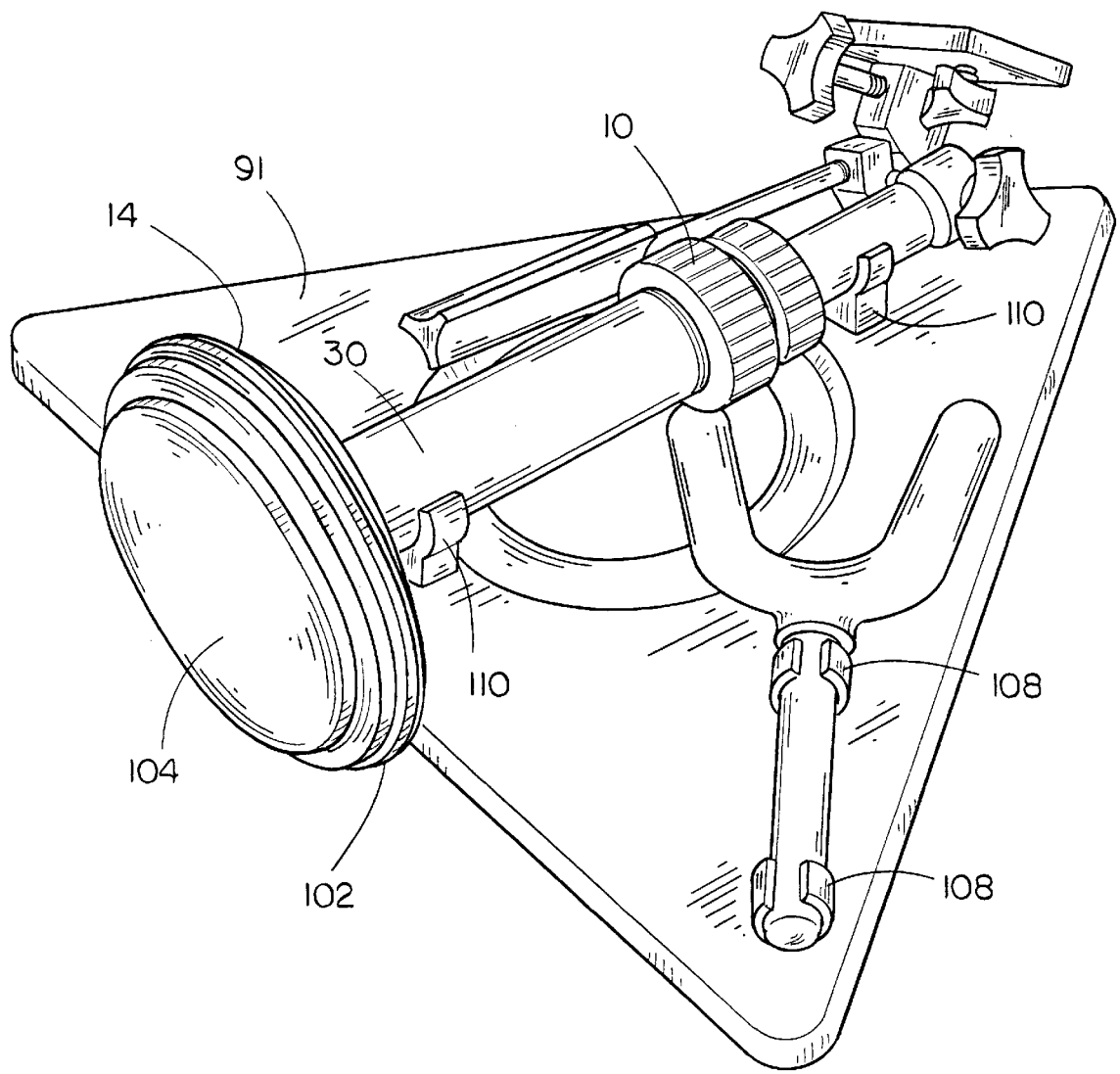

Referring now to FIGS. 18 and 19, there is shown an isometric view of stand 10 according to the present invention comprising a magnetic base 14, illustrating its use with large base 91 to provide support for a camera 80 (FIG. 18)

on a nonmagnetically attractable surface (not shown) which may be a tabletop, shooting bench, and the like. Base 91 may be any of the embodiments described above. In a preferred embodiment, base 91 employs a magnetic clamp of the type shown and described by way of reference to base 90" of FIG. 17. In the embodiment of FIG. 18, base 91 further comprises one or more, and preferably two, optional attachment clips 108 which may employed to removably retain stem 60 (see FIG. 20) of yoke 16 (see FIG. 20) when not in use. Base 91 may further comprise one or more, and preferably two, optional attachment clips 110 which may be used to removably retain stand 10 when not in use. In an embodiment no shown, compartments may likewise be formed within the large plastic base for storage of various accessories, such as aiming device attachment members such as yoke 16, camera accessories and film, personal items, and so forth.

FIG. 19 depicts an embodiment of the present invention having self-storage features thus allowing base 91 to additionally function as a means for packaging the system, thus making the system readily portable when not in use. The self-contained nature of the embodiment of FIG. 19 also simplifies the packaging requirements, e.g., for retail distribution, or, depending on the nature of the retail or distribution environment, may eliminate the need for external packaging all together. FIG. 19 also best illustrates an embodiment of the present invention wherein plate 102 may be secured directly to magnetic base 14 via magnetic attraction. In the embodiment shown in FIG. 19, the plate 102 is attached for storage so that upper surface 104 (which faces magnetic base 14 in the clamping configuration of FIG. 18) faces away from magnetic base 14, thus shielding magnetic base 14 from other magnetically attractable or magnetically sensitive objects when not in use.

In a preferred embodiment, vertical leg 30 is removably attached to magnetic base 14, for example, with complimentary mating threads or the like. Thus, when it is desired to store the unit, vertical leg 30 may be removed from the base, e.g., by unscrewing the leg, and secured within clips 110. In this manner, magnetic base 14 itself may remain in the operable position (see FIG. 18), e.g., with base 91 juxtaposed between magnetic base 14 and metal plate or pan 102 (see FIG. 19) and retained by the clamping action there between. Accordingly, only the vertically extensible portion of stand 10 need be secured to clips 110, thus providing compact storage of the unit and allowing the unit to be set up and taken down in convenient fashion.

Figure 20:
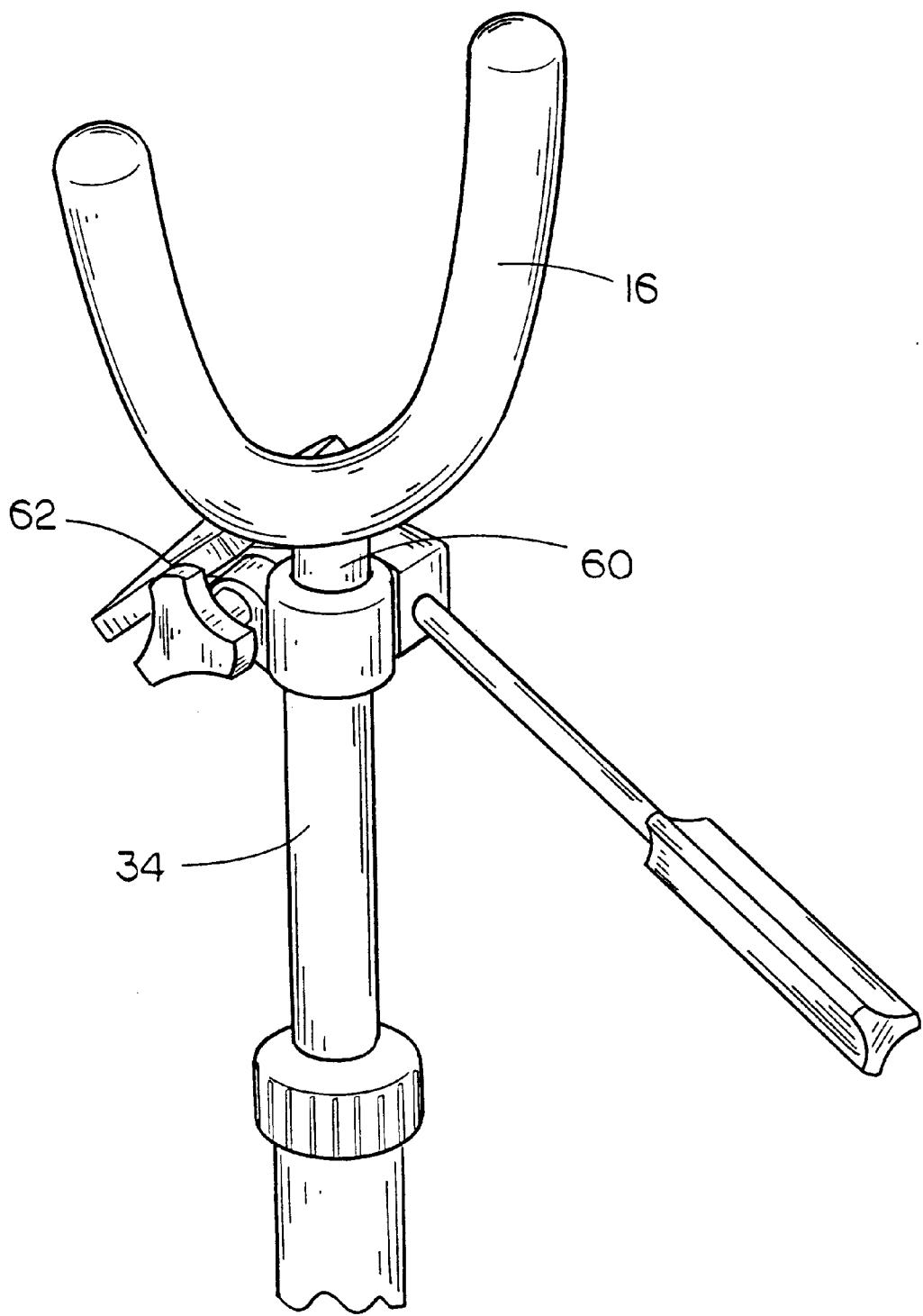
FIG. 20 illustrates a preferred embodiment wherein a firearm yoke may be operably retained on the stand without the need for removing an attached camera mount.

FIG. 20 illustrates a preferred embodiment wherein stem 60 of firearm mount or yoke 16 may be operably retained axially within stem 34 without the need for removal camera mount 62. In this manner, camera mount 62 may simply be pivoted and secured in a position which does not interfere with the insertion and use of yoke 16.

Figure 21:
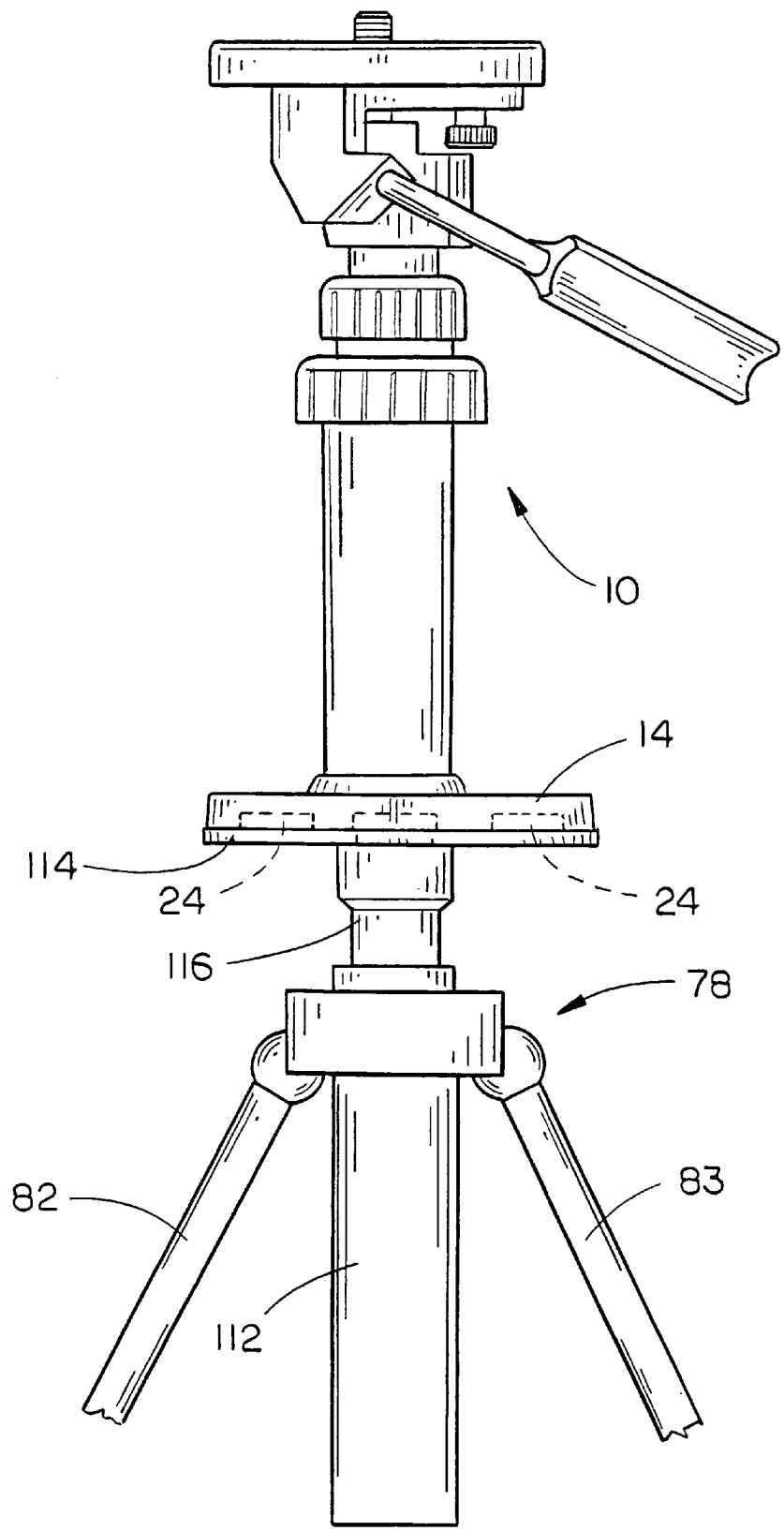
FIGS. 21 and 22 show an embodiment of the present invention, wherein a stand in accordance with the present invention may be adapted for use on a nonmagnetic surface.
Figure 22:
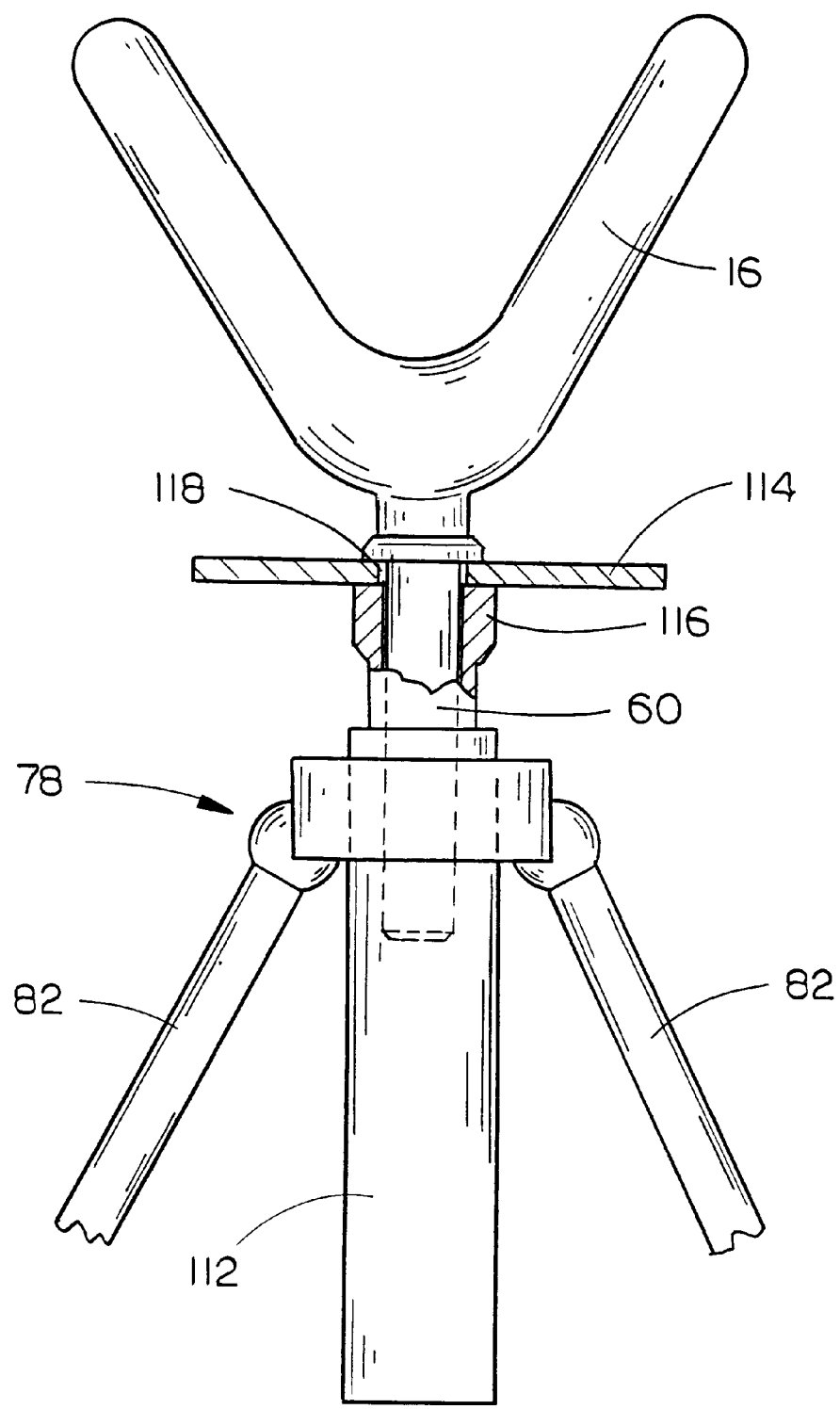

Referring now to FIGS. 21 and 22, there is shown yet another embodiment of the present invention, wherein a stand 10 in accordance with the present invention may be adapted for use on a nonmagnetic surface. This embodiment provides a tripod base 78 which may be used in conjunction with the stand 10 comprising magnetic base 14. Stand 10 may be any of the embodiments shown and described herein. The nonmagnetically attractable surface may be any surface on which it may be desirable to support a firearm, camera, or other aiming device as described herein. Such nonmagnetically attractable surfaces include, but are not limited to, tabletops, benches, floors, the ground, pavement, and the like. The tripod may be of any type having three or more extensible legs 82. Where freestanding support of the aiming device is not necessary or desired, a mono- or bi-podal arrangement may be substituted for the tripod arrangement by providing one or two extensible legs, respectively, instead of three or more.

Tripod base 78 comprises a stem 112 to which a magnetically attractable plate 114 is removably attached. Height adjustment of the tripod base may be made by adjustably extensible legs and/or by providing a height adjustment for stem 112. In the embodiment depicted, plate 114 is secured to stem 116 and is axially retained within stem 112. It will be recognized, however, that plate 114 may be securely affixed directly to any portion of the top of tripod base 78, such as stem 112, omitting stem 116. Stand 10 is placed on magnetically attractive plate 114 and secured thereto by the magnetic attraction between magnets 24 and plate 114. FIG. 22 shows a preferred embodiment wherein plate 114 comprises an opening 118 which allows additional aiming devices to be attached thereto. In the embodiment shown, stem 60 of yoke 60 is retained within opening 118. The depiction of FIG. 22 shows the tripod base 78 serving as a firearm stand, even in the absence of magnetic stand 10. In an embodiment not shown, yoke 16 may be replaced with another removable attachment or mounting device, e.g., attachment or mounting device for a camera, spotting scope, laser device, sextant, and the like. Thus, for example, a camera attachment device 62 (see FIG. 2) may be used in place of yoke 16, thus allowing tripod base 78 to be used as a both a conventional tripod and a support for magnetic stand 10.

The description above should not be construed as limiting the scope of the invention, but as merely providing illustrations to some of the presently preferred embodiments of this invention. In light of the above description and examples, various other modifications and variations will now become apparent to those skilled in the art without departing from the spirit and scope of the present invention as defined by the appended claims. Accordingly, the scope of the invention should be determined solely by the appended claims and their legal equivalents.

What is claimed is:

1. A support system for an aiming device for use on both a magnetically attractable surface and a nonmagnetically attractable surface, comprising a magnetic support device and a first base, said first base comprising a platform for providing stable upright retention of said magnetic support device on a nonmagnetically attractable surface, said magnetic support device comprising a second base, said second base comprising at least one magnet, a vertical leg extending upward from said second base, and an aiming device support member for supporting said aiming device, wherein said aiming device support member is supported on said vertical leg, wherein said first base is removably attachable to said second base, wherein said magnetic support device is operable to provide support for said aiming device on a magnetically attractable surface, and when said magnetic support device is removably attached to said first base said magnetic support device is operable to provide support for said aiming device on a nonmagnetically attractable surface.

2. The support system according to claim 1 wherein said aiming device support member comprises a mount selected from the group consisting of a camera mount or rifle mount.

3. The support system according to claim 1 wherein said aiming device support member is a spotting scope mount.

4. The support system according to claim 1 wherein said aiming device support member comprises a generally U-shaped yoke.

5. The support system according to claim 1 wherein said aiming device support member comprises a camera mount.

6. The support system according to claim 1 wherein said vertical leg is a height adjustable leg comprising two or more telescoping members.

7. The support system according to claim 1 wherein said first base comprises a magnetically attractable surface.

8. The support system according to claim 1 wherein said first base comprises a nonmagnetically attractable platform and an orifice for removably receiving said second base.

9. The support system according to claim 8 wherein said orifice is formed by a recess within the surface of said platform.

10. The support system according to claim 8 wherein said orifice is formed by a peripherally raised wall formed on the surface of said platform.

11. The support system according to claim 8 wherein said orifice engages said second base via complimentary mating threads.

12. The support system according to claim 8 wherein said orifice comprises a magnetically attractable bottom.

13. The support system according to claim 8 further comprising a removable magnetically attractable member, wherein said first base and said second base may be secured by juxtaposition of said first base between said second base and said magnetically attractable member.

14. The support system of claim 13 wherein said second base comprises an opening allowing a portion of said magnetically attractable member to physically contact a portion said first base.

15. The support system of claim 13 wherein said magnetically attractable member is sized to magnetically attach to said second base to provide a cover for said second base when said support system is not in use.

16. The support system of claim 13, wherein said magnetically attractable member sized to magnetically attach to said second base to provide an spacer means to neutralize the magnetic force of said second base rending said attachable member non-magnetic and thereby safe to use with devices adversely affected by magnetic fields.

17. The support system of claim 1 wherein said first base comprises a magnetically attractable platform for magnetically attaching said magnetic support device thereto, said first base further comprising three or more legs supporting said magnetically attractable platform.

18. The support system of claim 16 wherein said three or more legs supporting said magnetically attractable platform comprise three extensible legs.

19. The support system of claim 17 wherein said magnetically attractable platform comprises an opening for removably receiving a mounting device.

20. The support system of claim 18 wherein said mounting device is selected from the group consisting of a firearm mount and a camera mount.

21. A support system for an aiming device for use on both a magnetically attractable surfaces and a nonmagnetically attractable surface, comprising a magnetic support base and a second base, said second base comprising a vertical adjustable leg for providing stable upright retention of said support system, said vertical adjustable leg extending upwardly from said magnetic support base, said leg further comprising a support for an aiming device, and three or more legs attached to said vertical adjustable leg, wherein said magnetic base can be removable attachable to said second base, wherein said support system is operable to provide support for said aiming device on a magnetically attractable surface, and when said magnetic base is removable from the second base is operable to provide support on a nonmagnetically attractable support surface.

22. The support system according to claim 21 wherein the aiming device is a camera, a a spotting scope or other optical devices.

* * * * *